March 15, 1966   NOBURO SASAKI   3,240,963
APPARATUS FOR GENERATING ULTRASONIC VIBRATIONS IN LIQUIDS
Filed Jan. 4, 1962   5 Sheets-Sheet 1
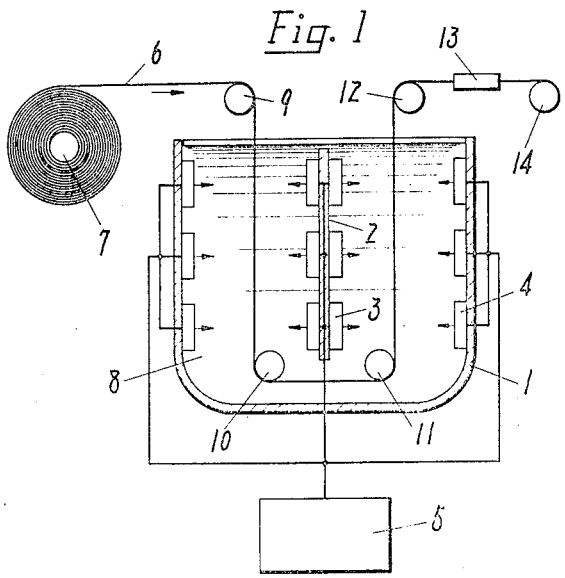
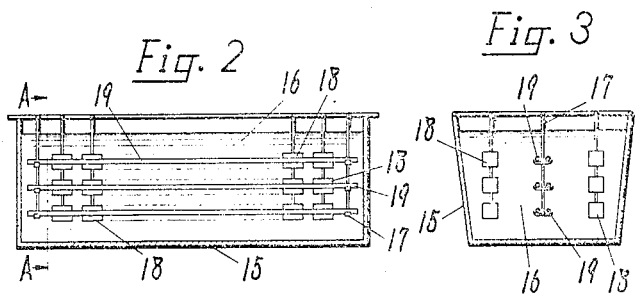
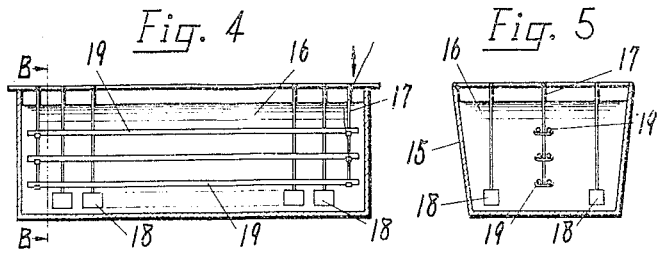
Inventor
Noburo Sasaki
by Michael S. Striker
Attorney

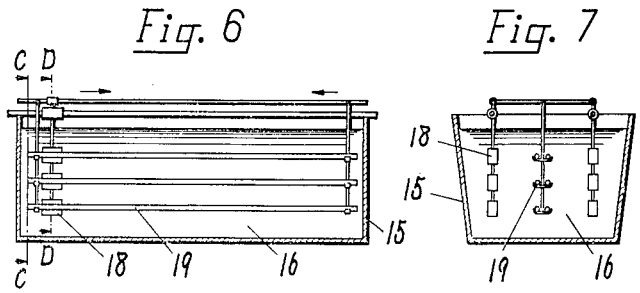
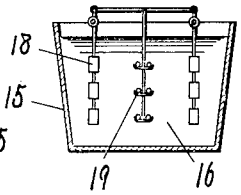
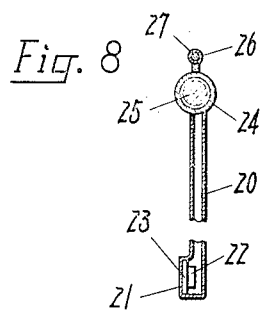
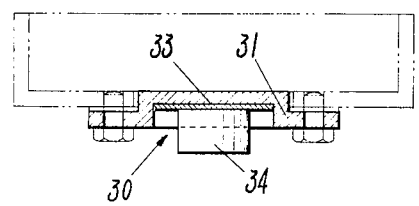
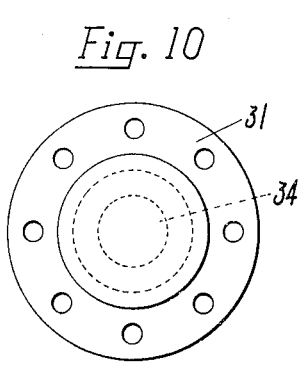
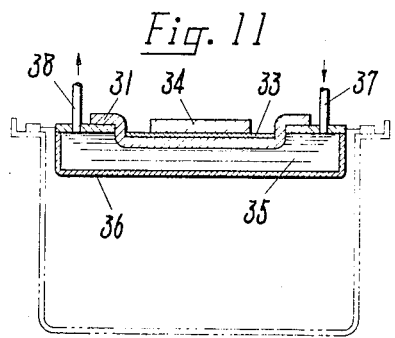

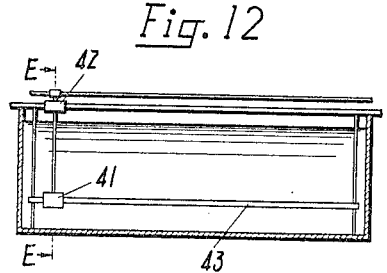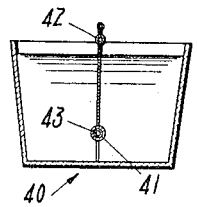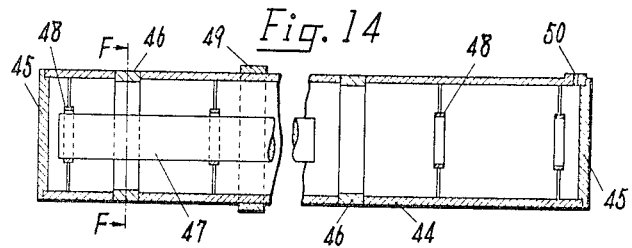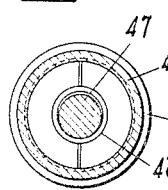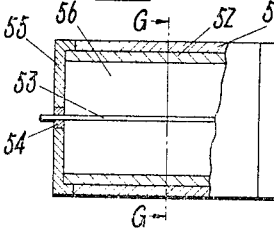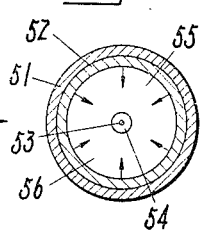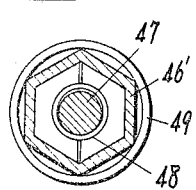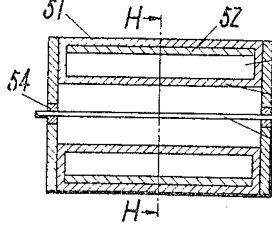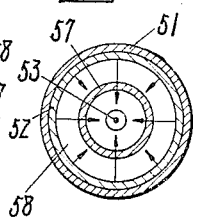

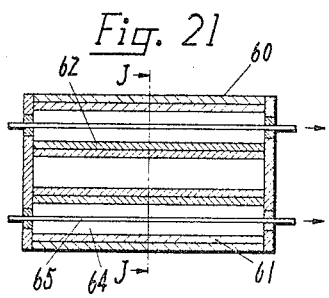
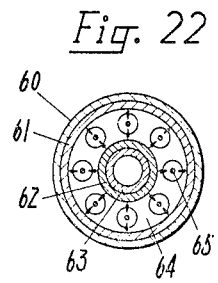
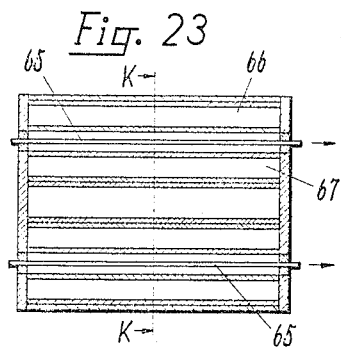
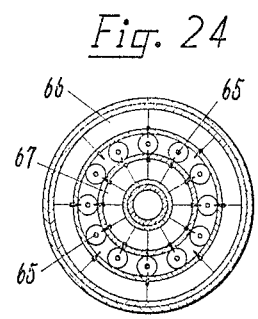
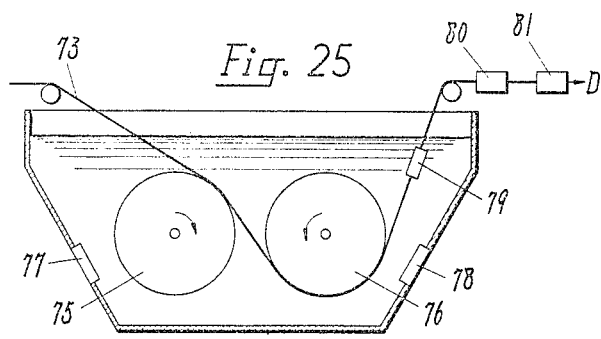

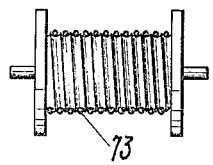
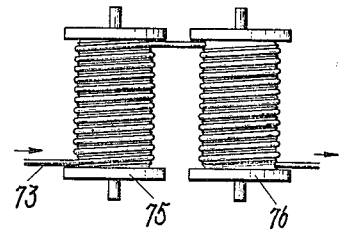
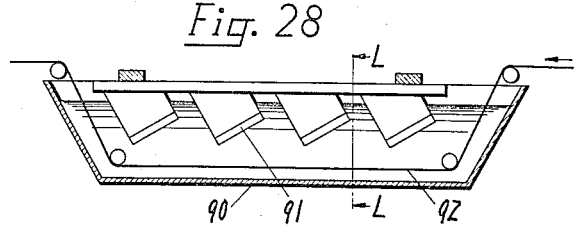
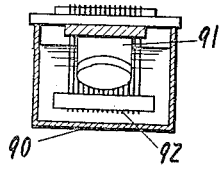

3,240,963
APPARATUS FOR GENERATING ULTRASONIC
VIBRATIONS IN LIQUIDS
Noburo Sasaki, Tokyo, Japan (% The Coal Research
Institute, 1 1-chome, Odasakae-cho, Kawasaki, Japan)
Filed Jan. 4, 1962, Ser. No. 164,363
4 Claims. (Cl. 310—9.1)

The present invention relates to an improved method and apparatus in an acid pickling process, more particularly to a novel acid pickling process applying ultrasonic wave radiation and apparatus performing the same.

Metals, especially iron, steel and stainless steel which underwent hot works, are normally covered with iron oxide, so-called "scale." For the purpose of removing such scales, an acid pickling process has so far been adapted only in dipping a metallic object or objects into a dilute solution of one of sulphuric, hydrochloric, nitric and phosphoric acids, or the mixture of two or more thereof, to dissolve a part of the scale and strip off the scale by the hydrogen bubbles generated on the metal surface.

In the prior pickling process, however, the simple dipping of the object matter into the pickling agent, even applying the mechanical agitation to the agent, had a low pickling efficiency, and besides the pickling agent was to be heated to approximately 70° C. Furthermore, as the pickled surface is in lack of luster it was generally necessary to polish the surface after the pickling process.

Also, it has been one of the difficult works to pickle or descale the inner surface of a metal tube of small diameter in the prior pickling process as well as in the mechanical polishing.

It is therefore the main object of the present invention to provide a new and effective pickling process for metals, especially iron, steel and stainless steel of the form of wire, tube, rod or plate, applying ultrasonic wave radiation which eliminates the prior disadvantages mentioned above.

Another object of the invention is to provide a pickling apparatus suitable for descaling metallic wire or band continuously.

Another object of the invention is to disclose many types of pickling apparatus suitable for descaling a metallic tube of small diameter.

It is a further object of the invention to provide special cooling type and center-radiation type transducers applicable to many kinds of pickling apparatus having different purposes of descaling.

Another object of the invention is to provide an acid-proof transducer usable in connection with the pickling apparatus as described above.

Other objects and advantages of the present invention will become apparent as the following detailed description progresses, reference being made to the accompanying drawings wherein;

FIG. 1 shows a schematic sectional view of one embodiment of the present invention having the purpose of conducting continuous picklings of a metallic band.

FIGS. 2-7 are some embodiments of the pickling apparatus for metal rod or tube; specifically FIG. 2 is a front elevational and sectional view of a pickling apparatus of fixed type; and FIG. 3 is a longitudinal sectional view of FIG. 2 along the line A—A, assuming the apparatus of FIG. 2 being complete; FIG. 4 is the similar view of FIG. 2 showing a pickling apparatus of object-fixed-transducer-vertical traveling type, and FIG. 5 is a sectional view of FIG. 4 along the line B—B; FIG. 6 is also a similar view to FIG. 2 showing a pickling apparatus of object-fixed-transducer-horizontal-traveling type; and FIG. 7 is a sectional view of FIG. 6 along the line C—C;

FIG. 8 is a sectional view of FIG. 6 along the line D—D, showing the construction of a unit transducer;

FIG. 9 is a longitudinal sectional view of one embodiment of an acid-proof transducer;

FIG. 10 is a plan of the said transducer;

FIG. 11 is a sectional view of a cooling type transducer;

FIGS. 12-14 are other embodiments of the invention being provided with center-radiation type transducers; specifically FIG. 12 is a front sectional view of a pickling apparatus of object-fixed-transducer traveling type, and FIG. 13 is a sectional view of FIG. 12 along the line E—E, and FIG. 14 is a front sectional view of the apparatus of transducer-fixed-object traveling type; FIG. 15 is a sectional view of FIG. 14 along the line F—F, similiarly assuming the apparatus of FIG. 14 being complete;

FIG. 16 is a sectional view of another embodiment of the apparatus being provided with a hollow polygonal transducer; FIG. 17 is a longitudinal sectional view of a cylindrical transducer, and FIG. 18 is a sectional view of FIG. 17 along the line G—G, assuming the said transducer being complete;

FIG. 19 is a longitudinal sectional view of a cylindrical cooling type transducer and FIG. 20 is a sectional view of FIG. 19 along the line H—H;

FIG. 21 is a longitudinal sectional view of a double-cylindrical transducer, and FIG. 22 is a sectional view of FIG. 21 along the line J—J;

FIG. 23 shows a double-cylindrical cooling type transducer, and FIG. 24 is a sectional view of FIG. 23 along the line K—K, FIG. 25 is a schematic sectional view of a pickling apparatus for continuous descaling of a wire; and FIG. 27 is a plan of parallel guide rollers, and FIG. 26 is a longitudinal section of one of the rollers in FIG. 27.

FIG. 28 is a sectional view of an apparatus having a plurality of oblique-radiation type transducers applicable to continuous descaling of many parallel wires.

FIG. 29 is a section of FIG. 28 along the line L—L in FIG. 28, assuming the apparatus of FIG. 28 being complete.

Briefly stating, in accordance with the present invention, fine hydrogen bubbles generated on the whole surface of acid-pickled metal are removed from the surface through the radiation of ultrasonic waves of suitable frequency and intensity thereby increasing the pickling efficiency to a great extent.

In general, it is believed that the ultrasonic waves display following characteristics in a liquid such as an aqueous solution.

(a) *Acceleration.*—In a simple calculation, ultrasonic waves having a frequency of 500 kc. and power of 1 watt/sq. cm. will generate an acceleration of 10,000 g. (g.: gravitational constant) which corresponds to that generated by a super-centrifuge of ten thousands of revolutions per minute.

(b) *Acoustic pressure.*—This causes liquid flow along the direction of wave propagation.

(c) *Cavitation.*—As the intensity of ultrasonic waves increase numerous bubbles are generated by the negative pressure with the periodic and active change of liquid pressure, and when they are crushed there are generated a high pressure and temperature.

As a result of the secondary effects of the above mentioned characteristics:

(1) Fine hydrogen bubbles generated on the whole surface of the metal to be pickled rapidly develop and leave the surface moving upward, thereby always exposing a fresh active surface which facilitates the chemical reaction of the pickling agent with the metal.

(2) Cavitation causes vigorous micro-agitation and heating effect which makes the pickling agent easily permeate between the fresh surface of metal and scale, thus stripping off and crushing the scales. At the same time, in consequence of the chemical reaction being accelerated the pickling process is performed at an unexpectedly rapid rate and also the pickled surface is found so smooth that polishing work which is needed after the prior pickling process is unnecessary.

The actual effect was proved in the following experiment. A test piece of stainless steel which was coated with thin layer of oxides, having leaden scales additionally generated thereon, was dipped into the pickling solution containing 25% of hydrochloric acid, 3% of nitric acid and 72% of water, at a temperature of 70° C. In this case the scale was roughly removed after 60 minutes leaving a lusterless surface. While, when the similar test piece was dipped in the same solution of a lower temperature of 30° C. under the radiation of ultrasonic waves of 40 kc. and 1.5 watt/sq. cm. for approximately 3 minutes, the scales were completely removed leaving a glossy fresh surface.

In the above experiment using the radiation of ultrasonic waves, it is understood that the pickling may be performed at a lower temperature such as room temperature and the frequency may be varied within a certain range, with a very satisfying result.

Now returning to the accompanying drawings, one embodiment of the pickling apparatus in accordance with the invention is shown in FIG. 1 drawn partly in section. It includes a pickling vessel 1 and supporting wall 2 in the midst of the vessel, and inside the vessel and on the wall a plurality of transducer sets 3 and 4 are arranged face to face. Each transducer is parallel-connected to an ultrasonic oscillator 5. A metal band 6 to be pickled is fed from a reel 7 through the pickling agent 8 existing between each set of transducer under the guidance of rollers 9, 10, 11 and 12. The band rolled up outside the vessel is wound around a winding reel 14 through washing and neutralizing device 13.

With the start of the oscillator or vibrator 5, the traveling metallic band is evenly radiated by a plurality of transducer sets on its both sides, and micro-agitation proportional to the frequency of ultrasonic waves is generated in the pickling agent. The metal surface will then be covered with fine and numerous hydrogen bubbles which immediately amalgamate each other developing into the larger bubbles and floating upward under the influence of the micro-agitation, cavitation and liquid flow generated in the said agent.

This will result in an acceleration of the chemical reaction between the pickling agent and metal surface, and the scales are partly dissolved in the solution, partly broken into pieces and all stripped off the surface. On the contrary, when the radiation is not applied, fine hydrogen bubbles adhere to the surface even when the solution is mechanically agitated, and in consequence the pickling process requires a considerable period of time, say approximately one hour and yet with an unsatisfactory pickling result.

The apparatuses shown in FIGS. 2–7 are some embodiments of this invention applicable to the pickling of metallic tubes. The complete pickling of inner surface of a tube which has been impossible by the prior process, may be carried out by these apparatuses in a short time. As shown in FIGS. 2 and 3, several tubes 19 which are placed on both sides of a supporting shelf 17 are dipped into the central position of the pickling agent 16 filled in the vessel 15. Many transducers 18 are aligned alongside the shelf and near the side wall of the vessel. They are arranged stepwise, as shown in FIGS. 2 and 3, so as to occupy the same level to the corresponding steps (in the figures there is shown 3 steps) of the supporting shelf 17. When the transducers connected parallel to a suitable ultrasonic oscillator (not shown) radiate ultrasonic waves of a definite frequency and power into the solution, the inner as well as outer surfaces of the tube are completely pickled and described within several minutes.

In this instance, if each tube is slowly rotated by a suitable driving means the pickling effect in the radial direction may be uniform.

For the purpose of decreasing the number of transducers it is of course possible to use other embodiments such as shown in FIGS. 4–7.

The apparatus shown in FIGS. 4 and 5 is provided with two lines of transducers on both sides of the supporting shelf, which may be reciprocally traveled in vertical direction, and the apparatus shown in FIGS. 6 and 7 is provided with two files of transducers which may be reciprocally traveled in horizontal direction, by a suitable driving means respectively.

One embodiment of the transducer fitted to the apparatus of FIG. 6 is shown in FIG. 8 in section drawn in an enlarged scale. It comprises tubular member 20 made of an acid-proof material having an enlarged chamber 21 at the lower end, to the front part of which a vibrating element 22 is fixed holding a metal plate 23 therebetween.

The transducer, as shown in FIG. 8, which is called sometimes "air-back" type, transmits strong ultrasonic waves from its front wall. At the upper end of the tubular body, a traveling ring 24 is fixed engaging with a threaded bar 25. The traveling of the transducer is further guided by a guide ring 26 secured to the upper end of the traveling ring 24, and a fixed bar 27 coacting with the guide ring 26 which prevents the transducer from vertical displacement. As the transducer is moved horizontally through the threaded bar which is connected to any driving means, the metal tubes are pickled uniformly with the vertically spaced transducers.

It is preferable that the driving means has a known mechanism so that the transducers travel reciprocally lengthwise in the pickling vessel 15.

In FIG. 9 there is shown a special transducer 30 in section. This type of transducer is to be fitted into an opening formed through the wall of pickling vessel, exposing its vibrating face to the pickling agent. It comprises circular guard plate or support member 31 made of acid-proof rubber or synthetic resin, having a central cavity in which a metal plate 33 silver-plated on both sides for serving as an electrode is embedded, on which plate a vibratile element 34 is secured by a known adhesive. The vibratile element 34 may be barium titanate or quartz. The transducer 30 is tightly affixed to the vessel by suitable means such as circumferential bolts.

In general, as the temperature of pickling agent is elevated up to 60°–90° C. the pickling effect increases accordingly. However, when the temperature of the pickling agent is rather high, it is sometimes necessary to prevent the guard plate from its swelling. For this purpose an alternative as shown in FIG. 11 may be used. In this instance, the guard plate 31 is covered with a cap 36 which is made of an ultrasonic transmissible material, forming a water jacket 35 in which coolant is circulated from inlet 37 to outlet 38.

In the above-described apparatuses a transducer of one-directional radiation type is used. But for the purpose of pickling and descaling a wire or rod, that of center-radiation type may preferably be used.

FIGS. 12 and 13 show one embodiment 40 equipped with a center-radiation type transducer 41 and its reciprocating means 42. An object 43, for instance, a steel rod to be descaled, is fixed in the pickling vessel and the transducer of a cylindrical form around the object 43 travels by the reciprocating means 42 whereby an even pickling may be performed without rotation of the object.

*Example 1.*—An annealed steel pipe of 5 meter (inner and outer diameters being 8 mm. and 10 mm.) was placed in the apparatus shown in FIG. 12 which was filled with 10% sulphuric acid of a temperature 80° C., and the transducer was traveled at the rate of 30 cm./min. An irradiation of ultrasonic waves of 25 kc. and 2 watt/sq. cm. in the agent pickled and descaled the pipe completely all over the inner and outer surface.

Another embodiment of a transducer-fixed-object traveling type apparatus is shown in FIG. 14. A cylindrical chamber 44 closed at its both ends with the end plates 45 is filled with pickling agent through inlet 50, and transducers 46 of center-radiation type are arranged in the chamber at appropriate intervals. The object 47 to be pickled of about half length of the chamber is supported loosely by a plurality of hollow supporters 48 and drawn magnetically by a ring magnet 49 surrounding the chamber.

For the convenience of manufacture, and for the purpose of descaling a tube of a larger diameter, a similar apparatus having a hollow polygonal transducer 46 as shown in FIG. 16 may be constructed.

Several types of transducers in accordance with the present invention incorporating to a wire drawn bench, especially suitable for continuous pickling of a long wire are shown in FIGS. 17–24.

A simple center-radiation type transducer is shown in FIGS. 17 and 18. It comprises cylindrical vibratile element 51 and a metallic electrode 52 fitted into the vibrating element and the combination is closed at the both ends with end plates 55 of insulating material. The interior is filled up with pickling agent 56. The wire 53 is fed through liquid-tight packing 54 provided at the central portion of the opposite end plates. The packing is made of, for instance, acid-proof rubber, and has a small hole through which the wire 58 is drawn without the leakage of the liquid agent. The ultrasonic radiation centers on as shown in FIG. 18 by arrows and the pickling is performed effectively through the short passage in the transducer.

When the temperature of the pickling agent is considerably high enough to necessitate cooling of a transducer to prevent the vibrating element from deterioration, a new transducer as shown in FIGS. 19 and 20 may be used. Only the difference of this transducer from that of FIG. 17 is that the former has a provision of inner cylinder 57 made of, for instance, synthetic resin and the like, with a thickness that permits the ultrasonic transmission and a smaller diameter than the electrode cylinder, thus forming a water-jacket 58 in which coolant is circulated.

To improve pickling efficiency, a double-cylindrical transducer as shown in FIGS. 21 and 22 may be constructed, in which the reference numerals 60 and 63 indicate outer and inner vibrating elements, and 61 and 62 indicate outer and inner electrodes respectively. In this arrangement a plurality of wires 65 in the pickling agent 64 may be descaled simultaneously.

Based on the same concept as in the transducer shown in FIG. 19, the transducer shown in FIG. 21 can be modified as FIGS. 23 and 24. In this arrangement, double water jackets 66 and 67 are provided concentrically to secure a better cooling of vibrating elements.

In FIG. 25 there is shown a schematic view of a compact pickling apparatus partly in section. It is for a continuous descaling of a wire, and is provided with a pair of drums rotatable in the opposite directions, the surface of which being grooved respectively as shown in FIG. 27 and FIG. 25. When a wire 73 is drawn in the direction D in FIG. 25 it will be guided to wind around the grooved drums 75 and 76 in the opposite directions.

It will be clearly understood that a pair of one-directional transducers 77 and 78 provided on both side walls of the pickling vessel will radiate ultrasonic waves of an appropriate intensity and frequency on the wire to descale the wire surface on its both sides. During the winding and rewinding movement around the drums, it should be noted that the wire is twisted at a very long pitch whereby the wire surface is to be irradiated evenly in the radial direction.

For the purpose of more complete descaling of a wire in this arrangement, an additional center-radiation type transducer 79 such as shown in FIGS. 17 and 19 may be provided after the unwinding passage as shown in FIG. 25. Then the wire is to be subject to cleaning and neutralizing process given by the suitable means of 80 and 81 in a conventional manner for removing the acidic solution from the wire surface.

In FIG. 28, there is shown a different type of the pickling apparatus for continuous descaling of wires, wherein plurality of disc transducers 91 are fixed above traveling wires 92 and obliquely to the bottom of a vessel 90. A downright radiation of ultrasonic waves in pickling liquid sometimes generate stationary waves due to the reflection from the bottom of a vessel. Therefore, the oblique radiation made by the apparatus as shown in FIG. 28 has an advantage of preventing the formation of stationary waves which causes uneven pickling effect. As shown in FIG. 29, a plurality of parallel wires 92 are descaled at the same time.

In the foregoing description, the pickling agent is explained to be an acidic solution. It should be pointed out, however, when a suitable detergent is used instead of the solution the above-mentioned process is eventually useful for removing fatty materials on a metal surface. This fact was easily proved after some experimental tests.

Although the present invention has been described with reference to some embodiments thereof, it should be understood that numerous other modifications and embodiments can be devised by those skilled in the art that will fall within the spirit and scope of the principles of this invention.

It is claimed:

1. An apparatus for generating ultrasonic vibrations in a liquid contained in a vessel having an apertured wall, comprising a vibratile element having a face portion and being arranged to vibrate in a direction normal to said face portion; vibrator means for exciting said vibratile element to vibrate in said direction, said vibrator means comprising a plate electrode having an outer face at least a portion of which is in direct contact with said face portion of said vibratile element, and an inner face, said inner and outer faces being located in planes substantially normal to said direction; and support means having a first portion arranged to fixedly receive said inner face of said electrode and a second portion arranged to be received in the apertured wall of the vessel in sealing engagement therewith and in proximate relationship with the liquid therein whereby, upon energization of the vibrator means, said vibratile element is excited and imports vibration to the liquid through the intermediary of said electrode and through said support means.

2. An apparatus for generating ultrasonic vibrations in liquids as set forth in claim 1, wherein said support means comprises a pan-shaped member and said electrode is at least partially imbedded in said pan-shaped member.

3. An apparatus for generating ultrasonic vibrations in liquids as set forth in claim 1, wherein said second portion of said support means is in direct contact with the liquid and consists of vibration transmitting material, so that vibrations are imparted to the liquid through the support means.

4. An apparatus for generating ultrasonic vibrations in liquids as set forth in claim 1, wherein said vibratile element is subjected to elevated temperatures, said apparatus further comprising vibration transmitting cooling means positioned intermediate said support means and the liquid to be vibrated for withdrawal heat from said vibratile element.

References Cited by the Examiner
UNITED STATES PATENTS

| | | | |
|---|---|---|---|
| 2,266,768 | 12/1941 | Kornei | 310—8.9 |
| 2,454,244 | 11/1948 | Wintermute | 310—8.9 |
| 2,612,860 | 10/1952 | Pendleton | 134—122 |
| 2,788,454 | 4/1957 | Zapponi | 310—8.7 |
| 2,802,758 | 8/1957 | Kearney | 134—1 |
| 2,937,292 | 5/1960 | Welkowitz et al. | 310—8.7 |
| 2,981,268 | 4/1961 | McAuley | 134—122 |
| 2,992,142 | 7/1961 | Kearney | 134—1 |
| 3,058,014 | 10/1962 | Camp | 310—8.7 |
| 3,066,232 | 11/1962 | Branson | 310—8.7 |
| 3,094,314 | 6/1963 | Kearney et al. | 310—8.7 |
| 3,101,419 | 8/1963 | Rich | 310—8.7 |
| 3,140,859 | 7/1964 | Scarpa | 310—9.7 |

MILTON O. HIRSHFIELD, *Primary Examiner.*

CHARLES A. WILLMUTH, *Examiner.*